Figure 7:
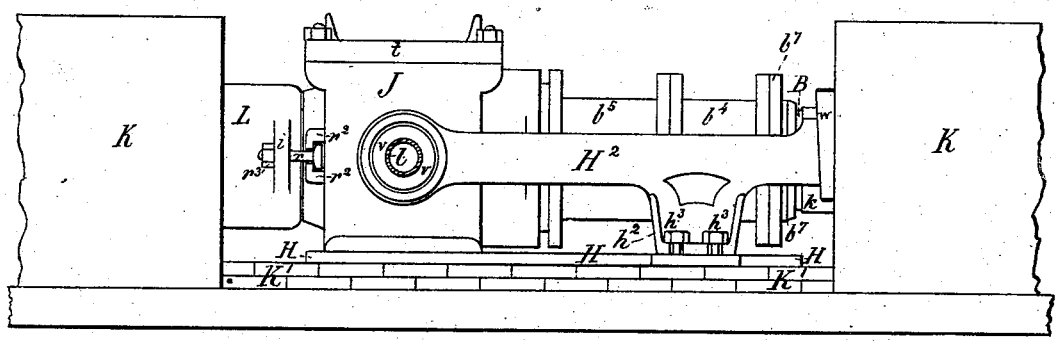

(No Model.)
2 Sheets—Sheet 1.
B. HOLLY.
APPARATUS FOR SUPPLYING STEAM IN CITIES.
No. 260,097. Patented June 27, 1882.
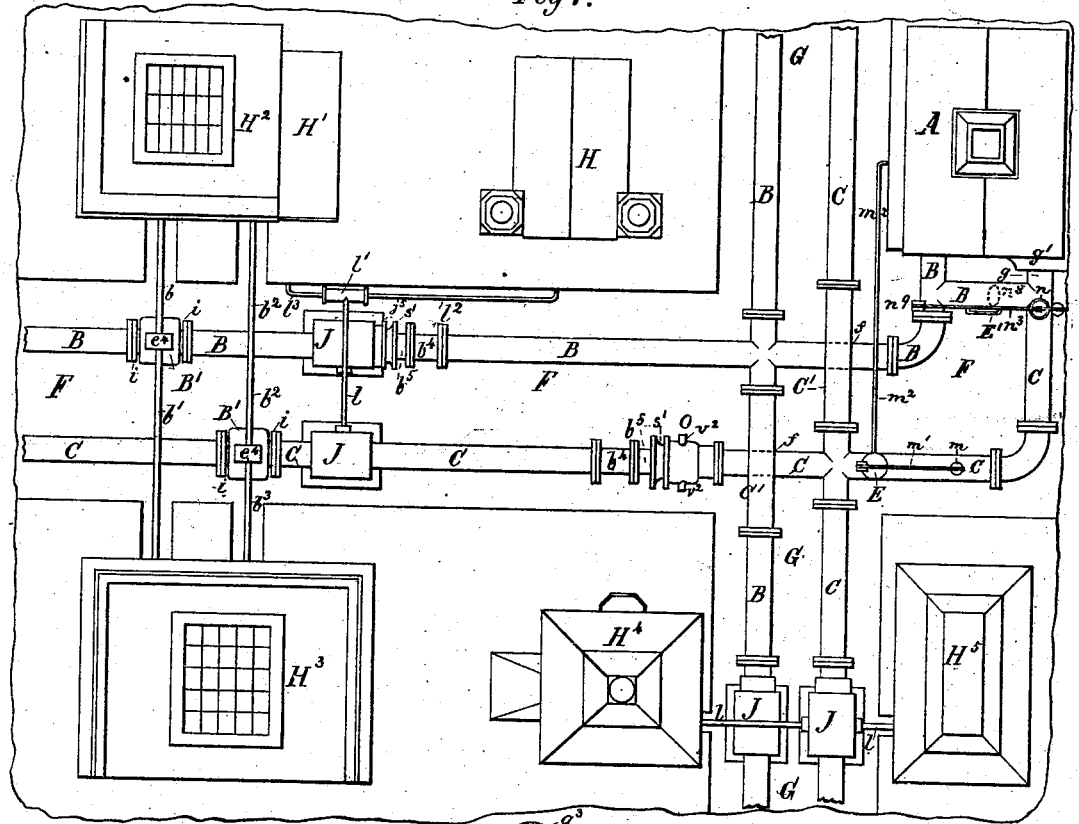
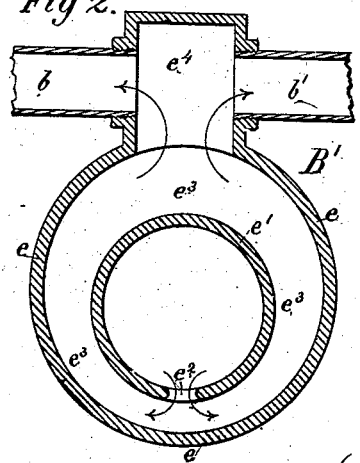
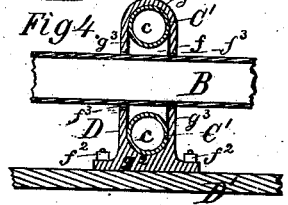
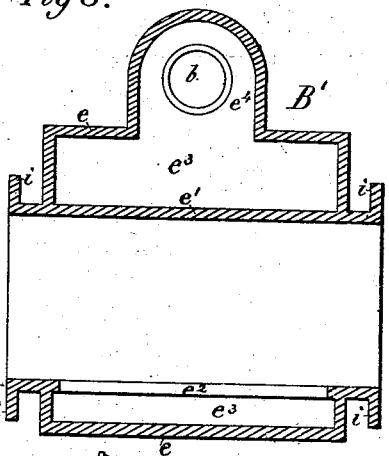
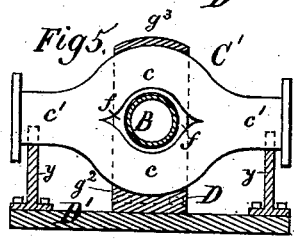
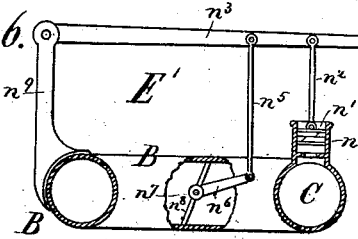
Witnesses:
J. F. Munson
J. P. Theo. Lang
Inventor:
Birdsill Holly
by his att'ys (No Model.) 2 Sheets—Sheet 2.

B. HOLLY.
APPARATUS FOR SUPPLYING STEAM IN CITIES.

No. 260,097. Patented June 27, 1882.

Witnesses: Inventor:

UNITED STATES PATENT OFFICE.

BIRDSILL HOLLY, OF LOCKPORT, NEW YORK.

APPARATUS FOR SUPPLYING STEAM IN CITIES.

SPECIFICATION forming part of Letters Patent No. 260,097, dated June 27, 1882.

Application filed April 18, 1881. (No model.)

*To all whom it may concern:*

Be it known that I, BIRDSILL HOLLY, a citizen of the United States, residing at Lockport, in the county of Niagara and State of New York, have invented a new and improved apparatus for supplying the buildings of cities, towns, and villages with power for driving machinery and other purposes, and with heat for warming and other purposes, of which the following is a specification.

My present invention has relation to the invention for new and improved apparatus for heating buildings and driving machinery in buildings situated along the streets of cities, towns, and villages for which Letters Patent of the United States No. 193,086 were granted to me July 17, 1877, and in which a single line of main underground pipe was utilized along the line of said streets and supplied with steam at high pressure, and from which single line high-pressure steam was led off into the said buildings, and therein reduced to low pressure for warming and other purposes by proper mechanism in said buildings, or used at high pressure in said buildings for power and other purposes, as circumstances might require.

My present invention consists, first, in a steam-heating system, of the combination of a steam-generator with a high and a lower pressure steam-main, and with a pipe conveying steam from the high-pressure main to an engine, a pipe to convey exhaust-steam from the engine to the lower-pressure main, and a pipe to convey exhaust-steam from the exhaust-main to the place of use; second, in a street steam-heating system, the combination of a steam-engine, a street-main receiving steam from an engine, and a heater receiving lower-pressure steam from the main; third, in a steam-heating system, the combination of a steam-main, an engine, means for conveying exhausted steam from the engine to the main, and means for conveying steam from the main to apparatus adapted for the use of said steam; fourth, in the combination of a steam-pressure regulator with the two lines of underground steam street-mains and a general steam-generator which supplies high-pressure steam to the one line of the mains, while the other line of the mains is supplied with either exhaust-steam or both exhaust and live steam; fifth, in the combination of an automatic regulator with an underground street-main and the feed-water works of the high-pressure-steam-supplying apparatus; sixth, in the combination of a distributer with the underground street receiving high-pressure mains, service-pipes, and a general steam-generator which at once supplies high-pressure steam to said receiving-mains; seventh, in a steam-distributer, in combination with the receiving steam-mains and the exhaust-steam mains, certain pipes and a general steam-generator which at once supplies steam to said receiving-mains, while the exhaust-mains are supplied with steam by the exhaust from engines worked by steam supplied from the high-pressure mains.

By my invention main pipes underground are utilized as exhaust-steam reservoirs, and buildings can be supplied with high-pressure steam from one line of main pipe or from any other source of supply of high-pressure steam for power and other purposes, and with steam at a relatively lower pressure from the other or fellow line of main pipe for warming and other purposes, the lower-pressure line of pipe receiving its steam for warming and other purposes from the exhaust of the engines driven by the high-pressure steam taken from the high-pressure line of pipe or other source.

Such underground lines of pipe as are herein referred to, and which are to be supplied respectively with steam at high pressure for affording power to drive machinery and for other purposes, and with steam at lower pressure for heating and other purposes, I contemplate using along the lines of all the streets of a city, town, or village in one connected system, or in districts of buildings of a city, town, or village in one connected system or apparatus or mechanism, of which—

Figure 8:
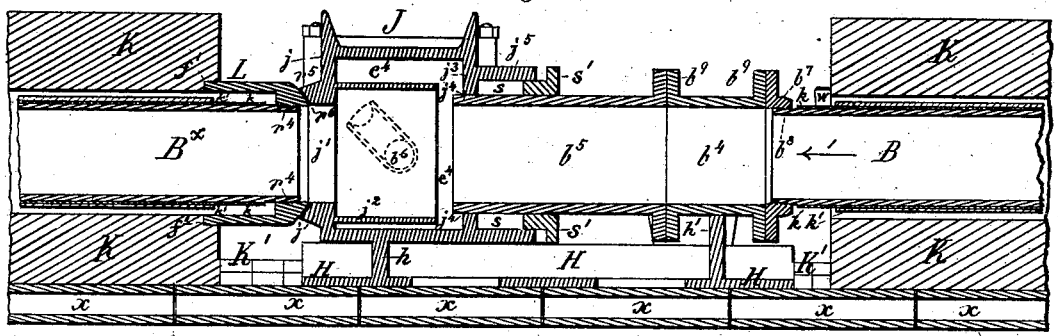
Figure 9:
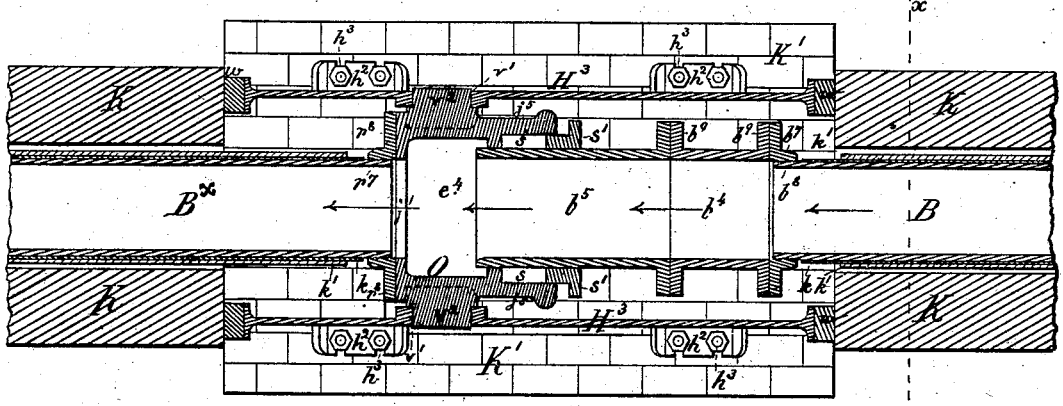
Figure 10:
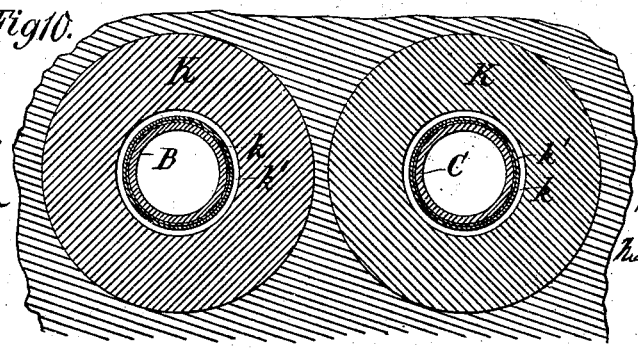

Figure 1 of the drawings illustrates a small portion or section situated, for example, on the line of a north-and-south street, (signified by the letter G,) which intersects an east-and-west street, (signified by the letter F.) Fig. 2 is a transverse section of a steam-distributer section of pipe B' and high-pressure service-pipes *b b'*, through which high-pressure steam is led off from the high-pressure main line B into steam-engines in buildings on either or both sides of the street F, and into which distributer exhaust-steam or lower-pressure steam is led by lower-pressure service-pipes $b^2$ $b^3$ from said engines into the lower-pressure main-line steam-pipe C. Fig. 3 is a longitudinal section of Fig. 2. Figs. 4 and 5 are views showing the construction of a two-way section of the main lines B and C when said lines pass each other at the intersection of streets F and G, and a mode of fastening said two-way section immovably in position. Fig. 6 is a view of a steam-regulator by means of which high-pressure steam may be admitted from the high-pressure line of pipe into lower-pressure line of pipe when the pressure in the latter line falls below twenty pounds pressure, or thereabout. Fig. 7 is a view in elevation, showing a junction-box, J, in its relation to either one of the lines of pipe B and C, and a protecting and insulating wooden covering, K, of said lines of pipes, and the means whereby said junction-box is permanently held in a fixed and immovable position. Fig. 8 is a vertical longitudinal section of Fig. 7. Fig. 9 is in part a plan view and in part a central horizontal section, showing the construction of an expansion-joint, (indicated at O in Fig. 1,) which may be used in connection with either the high-pressure line B or the lower-pressure line C to accommodate the longitudinal expansion and contraction of the metal pipe composing said lines, due to change of temperature, which longitudinal movements of said pipe under this arrangement are independent of the wood outer covering of said lines of pipe, said view also showing the means whereby the expansion-joint is permanently held in a fixed and immovable position; and Fig. 10 is a transverse section, in the line $x$ $x$ of Fig. 9, of lines of pipe B and C and outer wooden protecting-covering, K, and insulating materials.

In Fig. 1, A indicates a boiler-house situated on the corner of F and G streets, in which steam is generated, and from which steam at high pressure—say eighty pounds to the square inch—is supplied to the high-pressure main pipe B. The high-pressure steam passing along in the pipe B reaches and enters a high-pressure-steam-distributer section of pipe B', the interior construction of which is shown in transverse section in Fig. 2 and in longitudinal section in Fig. 3. From this distributer B' a high-pressure service-pipe, $b$, conveys high-pressure steam to drive an engine in a building, $H^2$, on the north side of F street, while through a like service-pipe, $b'$, steam at high pressure is conveyed from the said distributer to drive an engine in building $H^3$, on the south side of said street. The engine in building $H^2$ is made to exhaust its steam into a lower-pressure service-pipe, $b^2$, and thence into a like steam-distributer, B', connected and communicating with the lower-pressure line of main pipe C, while the engine in building $H^3$ is made to exhaust its steam into a lower-pressure service-pipe, $b^3$, and thence into a like steam-distributer, B', which connects and communicates with said line of main pipe C.

From the description thus far it will be seen that high-pressure steam from the source of power—to wit, steam-boilers in the boiler-house A—has been conveyed through a line of underground main high-pressure pipe B and service-pipes $b$ $b'$ to steam-engines in the buildings $H^2$ and $H^3$, respectively, and thence under exhaust or lower pressure, or at a pressure of about twenty pounds to the square inch, has been discharged from the engines in said buildings through the lower-pressure service-pipes $b^2$ and $b^3$ into the line of underground main lower-pressure pipe C, and from which pipe C, as a reservoir of steam, the lower-pressure steam is to be led off by proper service-pipes into buildings situated on said streets, and therein passed through properly-arranged reducing-valves, regulators, and meters, as circumstances may require, and used in steam-radiators for heating, and also for cooking, and also for driving light machinery, and for other purposes. The main pipes B and C both lead off from the boiler-house A, as shown, the pipe B being connected with and receiving high-pressure steam from the steam-boilers, while the end $g$ of the line of pipe C is closed and may be supported in the wall $g'$ of the boiler-house A, as indicated in Fig. 1, or in any other suitable manner. The high-pressure steam, as stated, having expended its high-pressure power in steam-engines in the buildings $H^2$ and $H^3$, and the exhaust-steam, at a pressure of about twenty pounds, having been conveyed through the lower-pressure service-pipes $b^2$ $b^3$ and the distributer B', connected with the line of main pipe C, now fills all parts of the main line C, ready to be distributed therefrom for the purpose of warming buildings, as well as for furnishing steam for all purposes where steam at no higher pressure than twenty pounds, or thereabout, will be sufficient.

As before stated, the high-pressure line B and lower-pressure line C are to be laid under ground adjacent to each other, and, for convenience and economy, in the same trench together, or together in the same outer protecting-covering in the trench. In laying down the same it is desirable that they should both occupy the same horizontal plane, or, in other words, be sustained upon the same bed-support, thus making one main bed floor or foundation serve for both lines; and hence to effect a proper as well as convenient extension of the lines B and C at, for example, where the streets F and G intersect or cross each other, I make provision for the same as follows: In Fig. 1, where the high-pressure pipe B along F street passes the lower-pressure pipe C laid along G street, I provide the line of pipe C with a section of pipe, C', having a two-way steam-passage, $c$ $c$, and with a central opening, $f$, of suitable dimensions through which to pass the pipe B, as shown in Figs. 4 and 5. In Fig. 1 the dotted lines on this section C' on the line of pipe C indicate that the pipe B is passed through the opening $f$ of said section. In the same figure a like section, C', is shown in connection with the line of pipe B on G street, through which section the lower-pressure line of pipe C passes in its way along F street. These sections—to wit, the section C', used in connection with the high-pressure line of pipe B as well as the lower-pressure line of pipe C, wherever they may be placed on any line of the main pipes B and C in the district of buildings to be furnished with steam either at high or lower pressure—are to be made fixed and immovable. In said Figs. 4 and 5 I have indicated one practical plan whereby these two-way sections C' of the main lines of pipe B and C may be held immovably in position, though many other modes or plans or constructions for holding them immovably in position might be adopted in lieu thereof. Fig. 5 shows the two-way section C' in elevation and confined in a strong metal yoke, D, as shown, which is securely fastened by bolts, as at $f^2$ in Fig. 4, to a heavy wide metal foundation-plate, D'. The base $g^2$ of this yoke is made to receive, fit, and conform to a portion of the exterior surface of the lower limb of the two-way section C', as shown, while an upright portion of the yoke, as at $g^3$, passes up and over the upper limb of said section, as shown. Openings $f^3$ are made through the upright portion $g^3$, through which openings $f^3$ the main line of pipe B can pass, as well as through the opening $f$ in the section C'.

Metal supports, as at $y\,y$, are properly bolted to the plate D', and have their upper ends crotched or forked so that the end portions, $c'$, of the section C' may rest therein, as indicated in Fig. 5. The metal plate D', Figs. 4 and 5, I set upon heavy brick or stone foundation-work in the earth below, and by means of heavy bolts secure it fixedly in position upon said brick or stone foundation. The steam-distributer B', I also make immovable by properly passing over and around it heavy metal straps, the straps being bolted to a heavy metal plate similar to D' in Figs. 4 and 5. The plate is then set upon and firmly bolted to a heavy brick or stone foundation in the earth beneath.

At proper points on both the high and lower pressure lines B and C throughout the district of buildings to be furnished with steam, junction service-boxes (signified at J in Fig. 1) are provided, which connect and communicate with the respective lines of pipe on which they are placed. These junction-boxes are provided with a steam-chamber communicating with the interior of the line of pipes B and C, and are made to remain fixed and immovable, and at the same time allow a portion of the line of main pipe B and C therewith to move forward and back within the junction-boxes in order to accommodate for the longitudinal expansion and contraction of said lines due to change of temperature without injury thereto or leakage of steam at the joints, as will be hereinafter described, and at proper points along said high and lower pressure lines B and C, I also provide expansion-joints—for example, as at O on the lower-pressure line of main pipe C in Fig. 1—in order to accommodate the longitudinal expansion and contraction of said lines of main pipe, as will be hereinafter described.

The steam-distributer B', which on the high-pressure line of pipe B in Fig. 1 receives steam from the line of pipe B for power service in the buildings $H^2$ and $H^3$, and which, on the lower-pressure line of pipe C in said figure, receives the exhaust-steam from the engines in said buildings and passes it into the lower-pressure line C, is constructed in the manner clearly shown in Fig. 2 in cross-section and in longitudinal section in Fig. 3. As shown in these figures, said distributer is made of a single casting of metal, with an outer main shell, $e$, and an interior annular hollow sleeve, $e'$, having a longitudinal opening, $e^2$, at its bottom, as shown, through which the steam used by the consumer passes.

Flanges, as at $i$, on the ends of the hollow sleeve $e'$ are provided, as shown, with which to bolt the distributer in position to the pipes B and C, as indicated in Fig. 1, and when in position on the line of pipe B, as in Fig. 1, the high-pressure steam enters the sleeve $e'$, passes through the longitudinal opening $e^2$ into the chamber $e^3$, up into an upwardly-extended portion or chamber, $e^4$, from which the high-pressure-steam service-pipes $b$ and $b'$ deliver the high-pressure steam to the buildings $H^2$ and $H^3$. This distributer B' is also shown in Fig. 1 applied to the lower-pressure main C, and there serves to receive the exhaust-steam from the engines in the buildings $H^2$ and $H^3$ through lower-pressure service-pipes $b^2\,b^3$, said exhaust-steam being received into the chamber $e^4$ from pipes $b^2\,b^3$, thence passing down through the chamber $e^3$, and up through the longitudinal opening $e^2$ of the sleeve $e'$, and out of the interior of the sleeve into the lower-pressure main C.

It will be seen by Figs. 1, 2, and 3 that the pipes $b\,b'$ and $b^2\,b^3$ connect with the distributer B' in its upwardly-extended portion $e^4$. This is done in order that these pipes may be elevated above and out of the way of the respective lines of pipe B and C, and so in direct line communicate between the buildings $H^2\,H^3$ and said distributer. In serving lower-pressure steam from the lower-pressure line C—on F street, for example—I connect a service-pipe, $l$, at one end with the junction-box J, situated on the lower-pressure line of pipe C on F street, and at its opposite end with a pipe-joint tube, $l'$, from which pipes $l^2$ and $l^3$ connect with proper constructions in the buildings H' and H for heating the same, or with light machinery not requiring a great power to operate the same, or with apparatus for cooking, or for other purposes only requiring the heat of steam at a low or moderate pressure, suitable reducing-valves, regulators, and meters being used in such connection as circumstances may require; or, for example, I take lower-pressure steam from the junction-box J, connected with the lower-pressure line of pipe C running along G street, and convey the same by lower service-pipes, $l$, into buildings H$^4$ and H$^5$ on opposite sides of G street, as shown in Fig. 1, therein to be used for such purposes as only require a lower pressure of steam. It is apparent that high-pressure steam might also be carried into these same buildings H$^4$ H$^5$ from the junction service-box J, which is connected with the high-pressure line of pipe B on said G street, and that the engines driven in said buildings could exhaust into pipes connecting with a distributer, B$'$, placed on the lower-pressure line of pipe C on said G street.

On the lower-pressure line C, E indicates an ordinary automatic regulator for the lower-pressure steam in the line of pipe C, with its weight $m$ adjusted on its lever $m'$ at twenty pounds pressure of steam within the line of pipe C; and from the valve-cylinder of the regulator I pass a pipe, $m^2$, into the boiler-building A and connect it with the feed-water feeding apparatus of such building, so that in case for any reason the pressure of the steam in the lower-pressure line of pipe C should exceed twenty pounds the valve of the regulator E will automatically rise and allow steam to pass to the feed-water works in the building A until the pressure in the line C becomes reduced to twenty pounds, whereupon the valve of the regulator E will resume its normal position.

In Fig. 6 I have shown a steam-regulator, E$'$, for use at a point near the boiler-house A where the high-pressure line B connects by means of this regulator with the lower-pressure line C, and which regulator is brought into action in case the exhaust-steam in line of pipe C falls below twenty pounds pressure, or thereabout. Its valve-cylinder $n$ (see Fig. 6) extends up from the pipe C, and its valve $n'$ receives the pressure of the exhaust-steam in line of pipe C. The valve $n'$ connects by means of rod $n^2$ with the lever $n^3$, which is so weighted at $n^4$ that the valve $n'$ will not become depressed so long as the pressure of the exhaust-steam in the line of pipe C remains at twenty pounds. The lever $n^3$ is jointed to a standard, $n^9$, attached to the high-pressure line of pipe B. A rod, $n^5$, connects the lever $n^3$ with a valve-lever, $n^6$, which at one end is fastened to the axis $n^7$, upon which a shut-off valve, $n^8$, is applied within the pipe B, as shown. Fig. 6 shows this steam-regulator in its normal closed position, and in which no high-pressure steam can pass from the line of pipe B into the lower-pressure line of pipe C. If, however, for any cause, the lower-pressure steam in the line of pipe C should fall below a pressure of twenty pounds, the valve $n'$, by reason of the weight $n^4$, will correspondingly descend in its cylinder $n$, while at the same time the rod $n^5$ will depress the short lever $n^6$, and correspondingly open the shut-off valve $n^8$, whereupon high-pressure steam will rush past the valve $n^8$ into the lower-pressure line of pipe C until the pressure of the steam in the lower-pressure line of pipe C is again raised to twenty pounds, whereupon the regulator E$'$ will resume its normal position, as shown in Fig. 6, and the high-pressure steam will, by the valve $n^8$, be shut off from the line of pipe C.

I would here state that the lower pressure of steam in the main C, derived from the exhaust of the high-pressure steam worked from main B, will be in proportion to or depend upon the rates of pressure of steam in the main line B.

I will now describe the best plan known to me for constructing and laying down the described mains.

In Figs. 7 and 8 the junction service-box indicated at J in Fig. 1 is shown in its relation to one of the lines of pipe, either B or C, as the case may be, and the insulating covering of said lines. This box J is made of metal, with its top and bottom, side and end walls inclosing a chamber, $e^4$, into which steam enters from one of the main lines of pipe—B, for example—in the direction of arrow 1 in Fig. 8. It has a broad heavy foundation metallic plate, H, as shown, from which metal supports project upwardly, one support, as at $h$, being connected with the bottom of the junction-box, and the other support, $h'$, forming a rest for a section, $b^4$, of the main line of pipe B, as shown.

The rear wall, $j$, is provided with an opening, $j'$, corresponding in dimension with the bore of the line of pipe B, through which the main body of steam passes on into a section, B$^x$, of said main line. Surrounding this steam-passage $j'$ a pipe, as at $j^2$, projects into the chamber $e^4$ a distance equal to about three-fourths of the horizontal diameter of said chamber. This is done in order to preserve the continuity of the main current of steam through the box J, and it is made of greater diameter than the section $b^5$ of the main line of pipe, in order to allow said part $b^5$ to freely move therein under any extraordinary longitudinal expansion of that portion of a main line of pipe which lies between one junction-box and the next one forward of it.

In the wall $j^3$, directly opposite the opening $j'$, is another opening, $j^4$, formed to properly receive one end of a section, $b^5$, of the main line of pipe B. On the wall $j^3$ a metal ring, $j^5$, is formed, as shown, and of greater diameter than section $b^5$ of the line of pipe B, so that when the section $b^5$ is projected therein, as represented in Fig. 8, an annular steam-packing space, $s$, will be formed around the section $b^5$, to be filled with proper steam-packing, and the same held in position and tightened up through proper means by the follower or gland $s'$, as may be required, to prevent escape of steam from the chamber $e^4$. A removable cover, $t$, is held in place upon the junction-box J by bolts, as indicated in the figure, the removal of which cover gives access to the interior of the junction-box when required. A service-pipe, $b^6$, leads out from the steam-chamber $e^4$, and its inner end is provided with a hood similar in construction to the "hood $g$" shown in Fig. 3 of my said Patent No. 193,086, and for the same purpose. This hood in said Fig. 8 is indicated in dotted lines, and is made to turn more or less up or down upon the inner end of the service-pipe $b^6$, thus permitting either dry or wet steam to pass from the chamber $e^4$ into and through the hood into the service-pipe $b^6$, as may be desired.

The section $b^4$, resting upon the support $h'$, has a coupling end, $b^7$, which is screw-threaded on its inside to receive and hold upon the screw-threaded end $b^8$ of the main line pipe B; and the section $b^4$ is firmly united to the section $b^5$ and the coupling end $b^7$ by bolts properly applied through its flanges $b^9$ and the adjoining flanges of section $b^5$ and said coupling end. When desired, these bolts may be removed and the section $b^4$ lifted entirely away from its position, and thus permit the section $b^5$ to be withdrawn from the junction-box J, thereby giving admission to said box for repairs.

The section of pipe $B^x$ of main line B, which receives steam from the steam-chamber of the junction-box J through the opening $j'$ of its wall $j$, is held in proper line and juxtaposition with the junction-box J by means of coupling-bolts $r$ on either side of a coupling-pipe, L. These bolts pass through ears $r'$, cast upon the coupling-pipe L, and have at one end a square head, which is rounded on its under side, which seats itself in a recessed projection, $r^2$, upon that part of the wall of the junction-box J which immediately encircles the steamway $j'$ of the junction-box. Screw-nuts, as at $r^3$, upon the bolts $r$ retain the parts in proper relation.

The coupling-pipe L is screw-threaded on its interior surface, so as to fit and be screwed onto the screw-threaded end $r^4$ of the section of pipe $B^x$, and at $r^5$ it is made of convex form to fit into a concave surface, $r^6$, of the wall $j$ of the junction-box. In this manner, while the section of pipe $B^x$ shown in Fig. 8 may incline up or down or at one side of a right line by reason of the bolts $r$ being rounded underneath their heads and by reason of the convex and concave formations $r^5$ and $r^6$, a steam-tight joint will be maintained between said convex and concave parts $r^5$ and $r^6$.

The mains B and C (shown in Fig. 1) and mains B $B^x$, (shown in Figs. 8 and 9,) throughout their entire extent between their connection with a junction service-box, J, (shown in Figs. 7 and 8,) or with an expansion-joint box, O, (shown in Fig. 9,) or with a steam-distributer, B', (shown in Figs. 1, 2, and 3,) are surrounded by a wrapping of asbestus, hair-cloth, or any other non-conducting substance, or with both asbestus and hair-cloth, as shown, thus confining and, as it were, insulating the steam within said lines of pipe in order to prevent its condensation. These mains, with their wrapping, are then each inclosed in a water-tight outside pipe, K, either of wood or iron lined with wood, and then laid in their underground trench and embedded in and covered first with sheet-zinc or tile, and thereafter with some substance like tan-bark or sawdust, while underneath such outside tube or pipe, K, tiles, as signified at $x$, Fig. 8, or any other proper water-conduit, are laid to carry off water which otherwise would settle around the outside pipe in the trench. In Figs. 7, 8, and 9 of the drawings the asbestus wrapping is designated at $k$, the hair-cloth at $k'$, and the water-tight outside pipe at K.

Wherever along the line of pipes B and C the junction service-boxes J, the expansion-joint boxes O, and the steam-distributers B' are placed between sections of the pipe of said lines, as indicated in the figures, said boxes and distributers may themselves be protected by a suitably-constructed water-proof covering lined with insulating material and having a trap-door for access therein.

It will be understood that it is very important to have the steam street-mains B and C (shown in Fig. 1) and those B $B^x$ (shown in Figs. 8 and 9) capable of longitudinal movement as they expand and contract under varying temperatures, and at the same time to have the main portion of the insulating covering—to wit, the strong water-tight wooden tubes K—remain stationary. Now, to effect this result the junction service-boxes J and the expansion-joint boxes O must all be held permanently in a fixed position and incapable of any longitudinal movement or displacement; and as one of many different plans which may be adopted for holding these parts in a fixed position, I have shown the plan represented in Figs. 7 and 8 of the drawings and the plan represented in Fig. 9 of the drawings. In said Fig. 8 it will be seen that the metal base support H beneath the junction-box J and the sections $b^5$ and $b^4$ of the main line of pipe designated at B $B^x$ is embedded or closed in with brick or stone work K'. This brick or stone work extends down a proper depth into the ground beneath the trench in which the lines of pipe are laid, and up also into the trench, so as to form a solid immovable abutment for the ends of the strong wooden tubes K, as represented in Figs. 7, 8, and 9. Strong metal bolts are also passed through the metal base support H into the brick or stone foundation K' and anchored therein. In addition to this, I provide broad heavy metal brace-plates $H^2$, as indicated in Fig. 7, as an abutment for the wooden pipe K. These plates in Fig. 7 are made with a circular opening at one end, so as to pass over and upon a circular tubular boss, $v$, formed upon the outside of the junction-box J, through which boss a service-pipe, $l$, may lead out from the steam-chamber $e^4$ of the junction-box. They are provided with lateral feet $h^2$, as shown in Figs. 7 and 9, through which bolts, as at $h^3$, are passed down into the brick or stone foundation K' and anchored therein, while wedges W are driven between one of their ends and the wooden tube K, as shown in Figs. 7 and 8, thus forming the means whereby an abutment-connection between the junction-box J and tube K can be maintained should any of the parts of the junction-box become so loose as to require the wedges to be driven down. As indicated in Figs. 8, 9, and 10, the steam-mains are not continuously inclosed by the wood tubes K.

The section of main pipe lettered $B^x$ in Fig. 8 is centered with respect to the bore of its inclosing tube K by means of the screw-threaded coupling-pipe L, which has its rear end, as at $f'$, inserted in an annular seat cut in the end of said section, thereby holding the section $B^x$ in its position, as indicated.

The section B of the main line of pipe, as shown in Figs. 7, 8, and 9, is held in line with the longitudinal axis of the sections $b^4$ and $b^5$ by reason of its screw connection with the coupling $b^7$, as well as free to move longitudinally within its inclosing tube K while expanding and contracting longitudinally. Thus it will be seen, first, that the junction-box J is immovably fixed in position; second, that the strong wooden tube-covering K of the main lines of steam-pipe has an abutting connection with said box J, or its foundation constituting a part of the same, so that a section of said lines, when laid down between two junction-boxes, J, will be held in abutting relation with said boxes, thereby insuring the said lines against displacement and consequent injury, as well as securing a direct or right-line movement of that part of the line, as at $b^5$ and $b^4$, so that when a section of a line of main pipe has one of its ends bolted to a junction-box, as indicated in Figs. 7 and 8, its opposite end is allowed at its part $b^5$ to move forward and back within the packing $s$ in a junction-box and forward and back in a chamber or space for such purpose provided therein, in accord with the amount of expansion and contraction of the whole length of the main lying between two junction-boxes J; and, further, that by reason of the immovability of the junction-box in a longitudinal direction there will never be any liability of the part $b^5$ to slip out of its connection with the junction-box, owing to the longitudinal expansion and contraction of that portion of the main lines lying between junction-boxes. In this manner, as one of the many modes of construction which could be adopted, I make the indispensable provision whereby sections of the main lines of pipe B and C or B, $B^x$, and C may expand and contract longitudinally without danger of breakage or leakage of steam, or disconnection of the main pipe with a junction-box, or the binding of the part $b^5$ with the junction-box, or the displacement of the strong wooden tube K out of line with the steam-pipes which they inclose or out of range with the general line of pipe as originally laid down for use. These same advantages I attain when using what I term an "expansion-joint" in connection with a main line of pipe, either B or C or B $B^x$ C, as the case may be. In Fig. 9 I show this joint at O, as well as one means of holding it immovably in position. Such means are in part essentially the same as shown for holding the junction-box J immovably in position in Figs. 7 and 8. The brick or stone work foundation K' is the same and the wooden pipe K abuts against its foundation K' the same as in Figs. 7 and 8. It is provided with two metal brace-plates, $H^3$, similar to one of the strong metal plates $H^2$ shown in Fig. 7, and which rest upon feet $h^2$, bolted down to and anchored in its foundation K'.

The plates $H^3$ are perforated at $v'$ to receive solid bosses $v^2$ cast upon the main body of the expansion-joint O, as shown, and thus sustain the weight of the expansion-joint. The plates $H^3$ extend nearly the whole length of the foundation K', and between their ends and the wooden tubes K K wedges, as at W W W W, are driven, and for the same purpose as the wedges W in Fig. 7. In this instance the coupling-pipe L shown in Fig. 7 is dispensed with, and the section of pipe $B^x$ makes a screw-threaded connection, as at $r^7$, with a coupling, $r^8$, at the rear end of the expansion-joint. Other parts—as $j'$, $j^5$, $s$, and $s'$—are the same as corresponding parts in Fig. 8. The steam from section of pipe B passes through the expansion-joint O into section of pipe $B^x$, and as the line of pipe B expands or contracts longitudinally under change of temperature the part $b^5$ thereof will move longitudinally to and fro within the expansion-joint O and its expansion-chamber $e^4$, thereby accommodating such longitudinal expansion and contraction, the same as in the case of the junction service-box J. In this manner, as one of many modes of construction which could be adopted, I make an indispensable provision, in connection with an "expansion-joint," whereby sections of the main lines of pipe B and C or B $B^x$ C may expand and contract longitudinally without danger of breakage or leakage of steam, or disconnection of the main pipe with the expansion-joint, or the binding of the part $b^5$ with the expansion-joint, or the displacement of the strong tube K, said tube, whether placed between one "junction-box" J and a succeeding one, or one expansion-joint O and a succeeding one, or one junction-box J and a succeeding expansion-joint O, or an expansion-joint O and a succeeding junction-box J, being made to abut at each end against the foundation K' of the same.

It will be understood that my exhaust-steam main will answer as a reservoir and supply-steam main, whether the exhaust-steam admitted into it is received from engines connected with a high-pressure-steam street-main or with any other source of supply of high-pressure steam.

In the drawings I have shown a distributer, B', with an outlet, $e^2$, chamber $e^3$, upwardly-extended chamber $e^4$, and with parts connecting with either the pipes $b$ $b'$ or $b^2$ $b^3$; also, a combination, with underground street-mains B C, of a permanent two-way section, C'; also, a junction service-box, J, with a chamber, $e^4$, an inner pipe, $j^2$, of less length than said chamber and of greater diameter than the opening $j^4$, in combination with a sliding section, $b^5$, of main B; also, a combination of a coupling-pipe, L, main pipe B$^x$, wooden tube K, abutment-foundation K', junction-box J, and base support H; also, a combination of a brace-plate, H$^2$, with a permanent junction-box and wooden tube K; also, a combination of means whereby the wooden tubes K and the junction-box J are held immovably, while the main steam-pipe B is allowed to move within the junction-box as said main steam-pipe expands and contracts longitudinally; also, a combination, with the expansion-joint box O, wooden tubes K, and steam-main pipe B B$^x$, of means whereby the expansion-joint O and the wooden tubes K are held immovable, while sliding section $b^5$ is allowed to move within the expansion-joint box at the time the main B, to which section $b^5$ is attached, expands and contracts longitudinally; also, a combination of a removable section, $b^4$, with a sliding section, $b^5$, expansion-joint box O, and main B; and, also, a combination of means for preventing endwise movement of coupling-sections, expansion-joints, and junction service-boxes of the lines of main pipe, and also of the wooden insulating covering of said pipe, while at the same time provision is made for expansion of the underground pipe free of said wooden coverings, whether live steam only or both live and exhaust steam be taken therefrom; but, while I have shown the above-mentioned features, I do not confine my invention as hereinafter claimed to the same; nor do I claim said features under this patent, as they are claimed under another patent of even date herewith.

What I claim as my invention, and desire to secure by Letters Patent, is—

1. In a street steam-heating system, the combination of a steam-generator with a high and a lower pressure steam-main, and with a pipe conveying steam from the high-pressure main to an engine, a pipe to convey exhaust-steam from the engine to the lower-pressure main, and a pipe to convey exhaust-steam from the exhaust-main to the place of use, substantially as described.

2. The combination of the regulator E' with the two lines of underground steam street-mains B C, and a general steam-generator which supplies high-pressure steam to the one line, B, of the mains, while the other line, C, of the mains is supplied with either exhaust-steam or both exhaust and live steam, substantially as described.

3. The combination of the distributer B' with the underground street-receiving steam-mains B, pipes $b$ $b'$, and a general steam-generator which supplies high-pressure steam to said receiving-mains, substantially as described.

4. The steam-distributers B', in combination with the receiving steam-mains B, exhaust-steam mains C, pipes $b$ $b^2$, and a general steam-generator which supplies high-pressure steam to said receiving-mains B, while the exhaust-mains C are supplied with steam by the exhaust from engines worked by the steam supplied from the mains B, substantially as described.

5. The combination of the pipe $l$ with main C, pipe $b^2$, pipe $b$, and main B, substantially as and for the purpose described.

6. In combination with the underground street-main C and the feed-water works of the high-pressure-steam-supplying apparatus, the automatic regulator, as at E, substantially as and for the purpose described.

7. In a street steam-heating system, the combination of a steam-engine, a street-main receiving steam from the engine, and a heater receiving low-pressure steam from the main, substantially as and for the purpose described.

8. In a street steam-heating system, the combination of a steam-main, an engine, means for conveying exhausted steam from the engine to the main, and means for conveying steam from the main to apparatus adapted for the use of said steam, substantially as and for the purpose described.

Signed in presence of two subscribing witnesses.

BIRDSILL HOLLY.

Witnesses:
I. H. BABCOCK,
B. D. HALL.